May 16, 1961 P. E. BRAUN ET AL 2,984,228
FUEL INJECTION SYSTEM
Filed Aug. 8, 1958 8 Sheets-Sheet 8

FIG. 17

P. E. BRAUN
H. W. FODDY
A. STEFAN
W. L. WAS
INVENTOR.

BY
ATTORNEYS

United States Patent Office 2,984,228
Patented May 16, 1961

2,984,228

FUEL INJECTION SYSTEM

Paul E. Braun, Birmingham, Harold W. Foddy, Dearborn, Andrew Stefan, Detroit, and Wilfred L. Was, Dearborn, Mich., assignors to Ford Motor Company, Dearborn, Mich., a corporation of Delaware Filed Aug. 8, 1958, Ser. No. 753,895

12 Claims. (Cl. 123—119)

This invention pertains to fuel injection systems and more particularly to a fuel metering system for internal combustion engines.

An object of this invention is the provision of a fuel metering system wherein the quantity of injected fuel is controlled by a plurality of fuel regulating means, each being responsive to separate engine demands.

Another object is the provision of a plurality of control means for limiting the free movement of a shuttle-piston in a fuel injection distributor.

A further object is the provision of a novel fuel control system wherein a shuttle-piston fuel metering distributor is controlled by a fuel metering cam that is positioned both axially and rotationally to effect the desired fuel control.

These and other objects and advantages of this invention will become apparent in the following description of an embodiment, in which.

Figure 1:
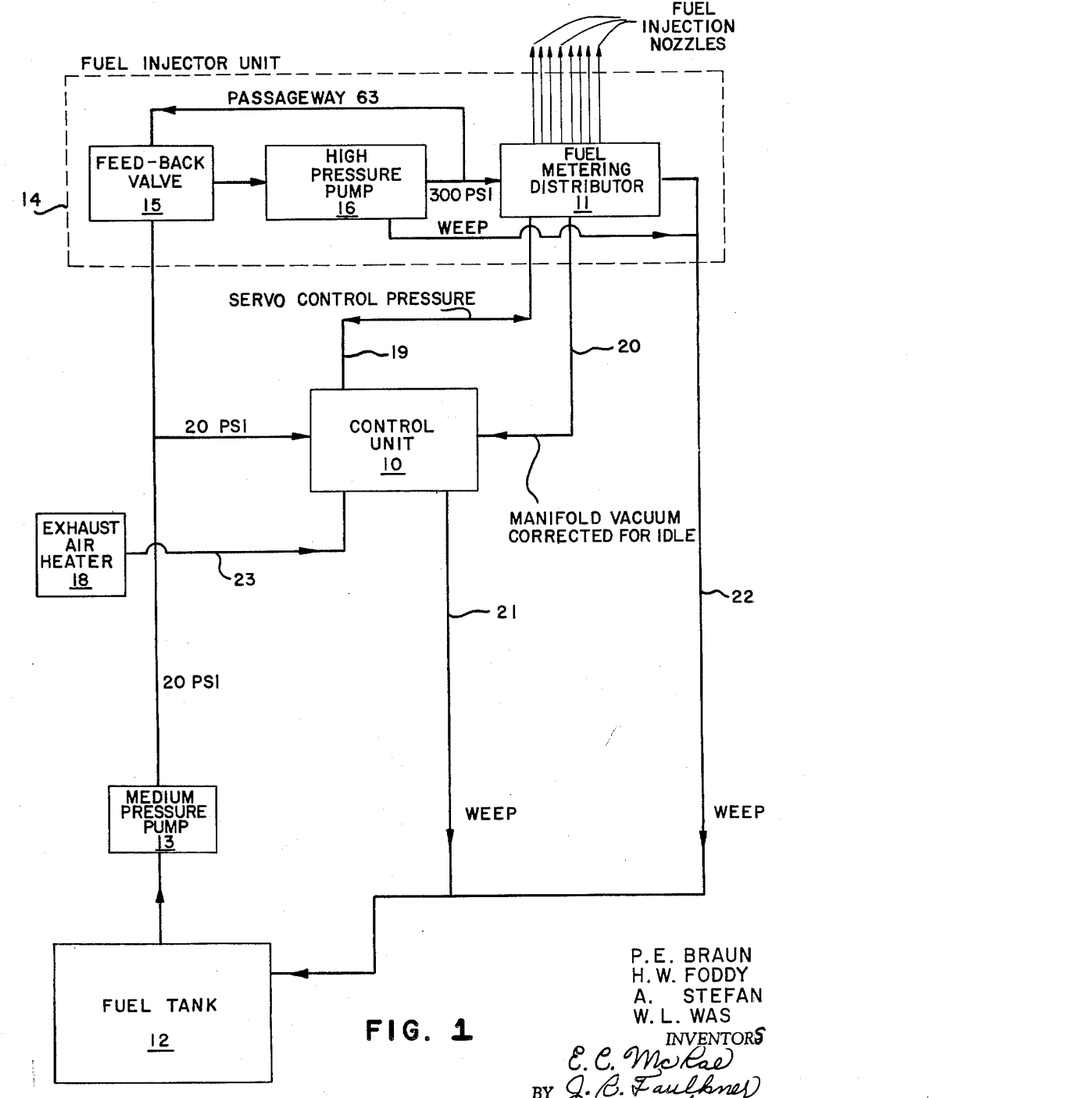
Fig. 1 is a system diagram.

The interconnection and arrangement of the several components of this fuel injection system is shown at Fig. 1. A pump 13 draws fuel from tank 12 and supplies fuel to control unit 10 and to fuel injector unit 14 defined within the broken lines. Within unit 14 is contained a high pressure pump 16, pressure regulator feedback valve 15, and fuel metering distributor 11. Distributor 11, in turn, supplies metered quantities of fuel at just the right time to the several fuel injection nozzles. Weep line 22 returns fuel which has been bypassed in the fuel injector unit 14 to tank 12. Weep line 21 returns fuel from control unit 10 to tank 12 after the pressure thereof has been spent in performing certain servo functions, as will be explained in connection with the control unit.

An exhaust air heater 18 supplies heated air to the control unit, the temperature of which is taken as an indication of engine temperature. The control unit 10 supplies signals to the injector unit 14 through two lines —19 and 20.

*The fuel injector unit*

A shuttle-piston type of high pressure metering injector is utilized wherein the movement of a shuttle or free piston is controlled and limited to determine the precise amount of fuel distributed to the several fuel injectors.

Figure 2:
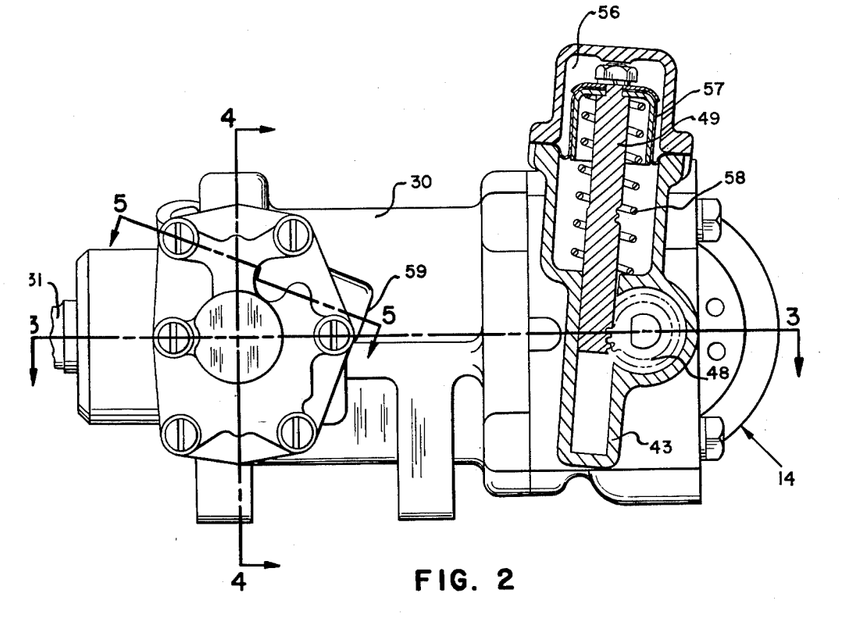
Fig. 2 is a plan view partially in section of the fuel metering distributor.
Figure 3:
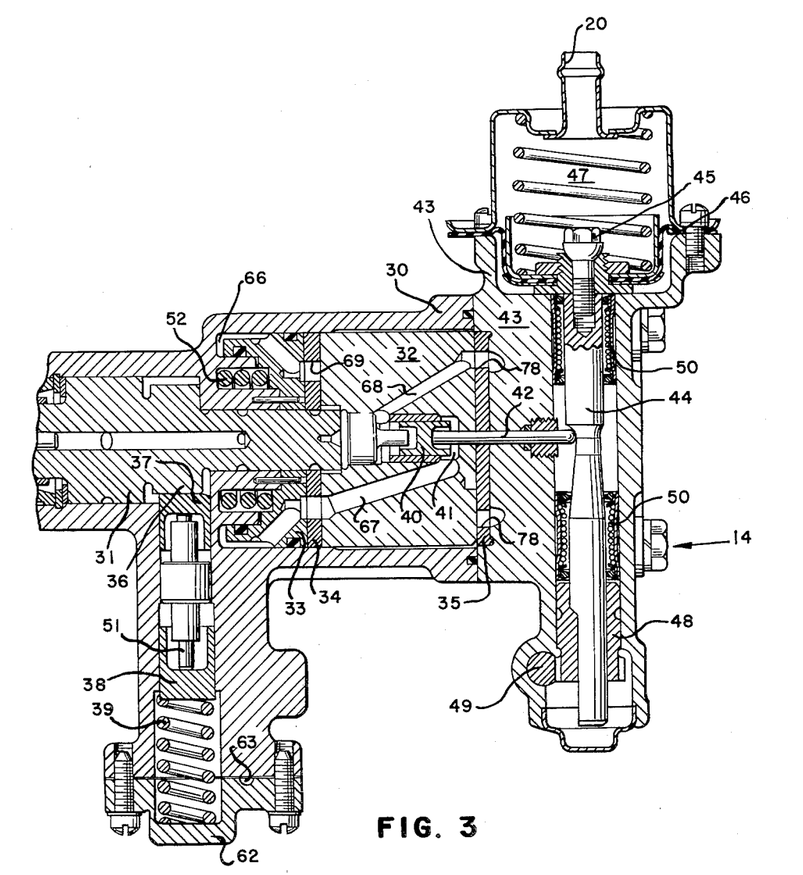
Fig. 3 is a sectional view of the distributor taken along line 3—3 of Fig. 2.

Referring particularly to Figs. 2 and 3, the fuel injector unit 14 has a body portion 30 in which a shaft 31 is rotatably carried. Shaft 31 includes an eccentric cam 36 which, in turn, drives cam follower 37 which is reciprocally received in body 30. Cam follower 37, in turn, drives push rod 51 against which pump piston 38 is firmly held by pump spring 39. This arrangement comprises the high pressure pump portion 16 shown in block form in Fig. 1.

Figure 5:
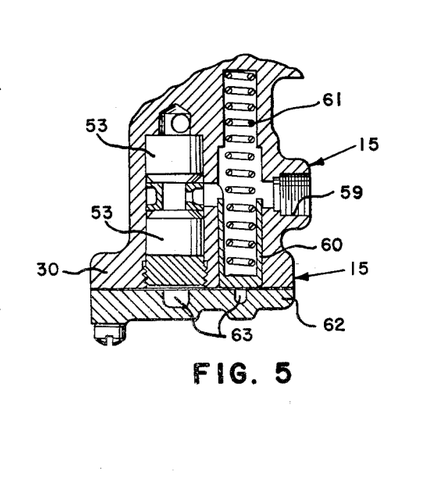
Fig. 5 is a partial section showing the feedback valve taken along line 5—5 of Fig. 2.

A fuel inlet 59, shown in Figs. 2 and 5 supplies fuel to a pair of identical inlet check valves 53 through a feedback valve 15 shown in Fig. 5. Feedback valve 15 includes a spring loaded regulating piston 60 reciprocally mounted within body 30 and operable to restrict the effective area between inlet 59 and inlet check valves 53. High pressure from the outlet side of the pump is carried through passageway 63, defined in pump cover plate 62, and admitted to the back side of piston 60 as shown in Fig. 5 in the fully opened position. The high pressure on the back side of piston 60 is balanced by the force of pressure regulating spring 61 to regulate the outlet pressure of the pump by restricting the quantity of inlet fuel admitted through feedback valve 15.

Figure 4:
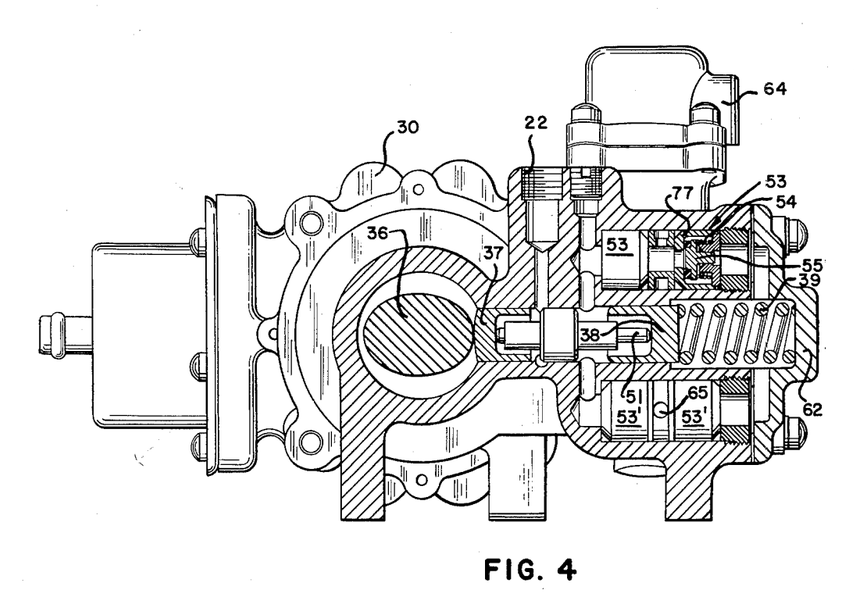
Fig. 4 is another sectional view of the distributor showing the high pressure pump taken along line 4—4 of Fig. 2.

Fig. 4 clearly shows the relationship of inlet check valves 53 and outlet check valves 53'. Also, there is included a section through one of these valves which may be taken as representative of all of the valves wherein a body portion 77 reciprocally carries a valve closure member 55 that is spring loaded by spring 54.

This arrangement is, therefore, a double-acting, high pressure pump which supplies fuel for admission to alternate sides of the shuttle piston. It is recognized, of course, that a certain amount of fuel will leak past push rod 51 and, therefore, as shown in Fig. 4, a low pressure weep 22 is provided whereby this fuel may be returned to the fuel tank.

An outlet passageway 65 conducts the fuel out of the high pressure side of the pump between check valves 53' into the fuel distributing portion of this unit. This high pressure fuel is then applied to the cavity 66 on the back side of pressure plate 33 as shown in Fig. 3. Pressure plate 33 is, therefore, pressure loaded by the high pressure outlet of pump 16 and is also mechanically preloaded by preload spring 52. The pressure from plate 33, therefore, provides a fluid seal between the inlet metering plate 34, metering sleeve 32, and outlet metering plate 35.

Shaft 31 is splined to rotatably drive metering sleeve 32. Axially defined within sleeve 32 is the free piston cavity 41 and free piston 40 reciprocally received therein. Sleeve 32 defines a pair of inlet passageways 67

(only one of which is shown in Fig. 3) which are operable to alternately supply high pressure fuel to either side of piston 40 through the inlet metering plate 34 upon the rotation of metering sleeve 32. Also, defined in sleeve 32 is a pair of outlet passageways 68, one of which is shown in Fig. 3, and which are operable to alternately provide escape for the fluid on either side of piston 40 upon the renewed application of high pressure fuel to the other side through an inlet passageway 67.

The movement of the shuttle piston 40 is controlled by push pin 42. The position of push pin 42 is, in turn, determined by its position on metering cone 44. The arrangement of the free piston within the metering sleeve and the arrangement for inlet and outlet metering through the ends thereof is fully shown and described in a copending application, Serial No. 622,973, filed Nov. 19, 1956, and now Patent No. 2,935,060, granted May 3, 1960 entitled "Fuel Injection System" in the name of Paul Braun and assigned to the assignee of this invention.

Push pin 42 is reciprocally carried in upper body portion 43. Traverse to pin 42 and reciprocally and rotatably carried therein is the metering cone 44. Cone 44 is conveniently carried between a pair of ball bushings 50 in order that the axial and rotational movement of said cone, as will subsequently be described, may be effected with a minimum of hysteresis.

The axial movement of cone 44 is affected by bellows diaphragm 46, secured by bolt 45 to one end of cone 44. Bellows diaphragm 46 is subjected to the pressure in vacuum chamber 47 which is in communication with a source of manifold vacuum through line 20. Therefore, a signal is applied to metering cone 44 which is a function of engine load in accordance with manifold vacuum as applied to vacuum chamber 47.

A second set of operating parameters or conditions is fed into the device by the rotation of metering cone 44. A pinion gear 48 is received on metering cone 44 and is axially slidable therewith to permit the axial movement of cone 44 but which, when driven by rack 49, causes the rotation of cone 44. As best seen in Fig. 2, rack 49 is terminated by a servo bellows 57. Bellows 57 responds to pressure within servo pressure chamber 56, which chamber has a control pressure inlet 64 shown in Fig. 4. Inlet 64 receives a control pressure from control unit 10 through lead 19 as shown in Fig. 1. A spring 58 is positioned to oppose the pressure within chamber 56 and thereby bring the rack 49 into a state of pressure equilibrium in accordance with the pressure applied into chamber 56 by control unit 10.

As will be subsequently shown in connection with the detailed description of the control unit 10, a fluid pressure is computed therein, the value of which is a function of barometric pressure, air temperature and engine temperature whereby the amount of fuel which is metered by the fuel metering distributor 11 is a function of each material variable that affects the engine's fuel requirements. Cone 44 is cam ground with a metering contour especially selected for the accomplishment of this purpose, the contour of which will be subsequently detailed.

In the operation of the fuel metering distributor, shaft 31 is preferably driven at cam shaft speed by the engine which causes metering sleeve 32 to rotate therewith. High pressure pump 16, upon the reciprocation of pump piston 38, supplies fuel at approximately 300 p.s.i. to cavity 66 on one side of pressure plate 33. The pressure thereby placed upon this plate causes it to bear to the right against inlet metering plate 34 whence the pressure is transmitted through metering sleeve 32 to outlet metering plate 35 thereby providing a seal between the relatively rotating components. As shown in Fig. 3, a pair of inlet ports 69 are provided in inlet plate 34 and are registerable with inlet passageways 67 upon rotation thereof. These, therefore, place the high pressure outlet from pump 15 alternately on opposite sides of free piston 40 whence fuel therefrom is alternately ejected through outlet passageway 68 and through corresponding outlets 78 defined within outlet metering plate 35. The extent of movement of the free piston 40 is controlled by the position of cam 44 which, in turn, is controlled by the manifold vacuum in chamber 47 and the control pressure in chamber 56.

*The control unit 10*

Control unit 10 may be conveniently mounted on an engine's intake manifold and thereby a means for the control of the quantity of air which is admitted into the intake manifold in the manner of the throttle body portion of a carburetor. Control unit 10 performs several functions, one of which is to provide a source of pressure-regulated liquid for the control of the rack and pinion servo bellows 57 within the fuel injector 14. Another function of the control unit is to provide an accelerator pump which directly injects a quantity of raw fuel into the intake manifold upon sudden increase in engine load to compensate for the inherent time lag in a fuel injection system. A further function of the control unit 10 is to provide raw priming fuel directly into the intake manifold during the cranking of the engine in amounts which are related to engine and ambient air temperature. Another function of the control unit is to provide a fast idle arrangement which is infinitely variable with temperature within its intended range. An anti-stall arrangement is also provided which automatically admits additional air into the intake manifold upon conditions of imminent engine stall which has the immediate effect of increasing the quantity of injected fuel so as to avert a stall.

*The fast idle function*

Figures 6, 7, 15:
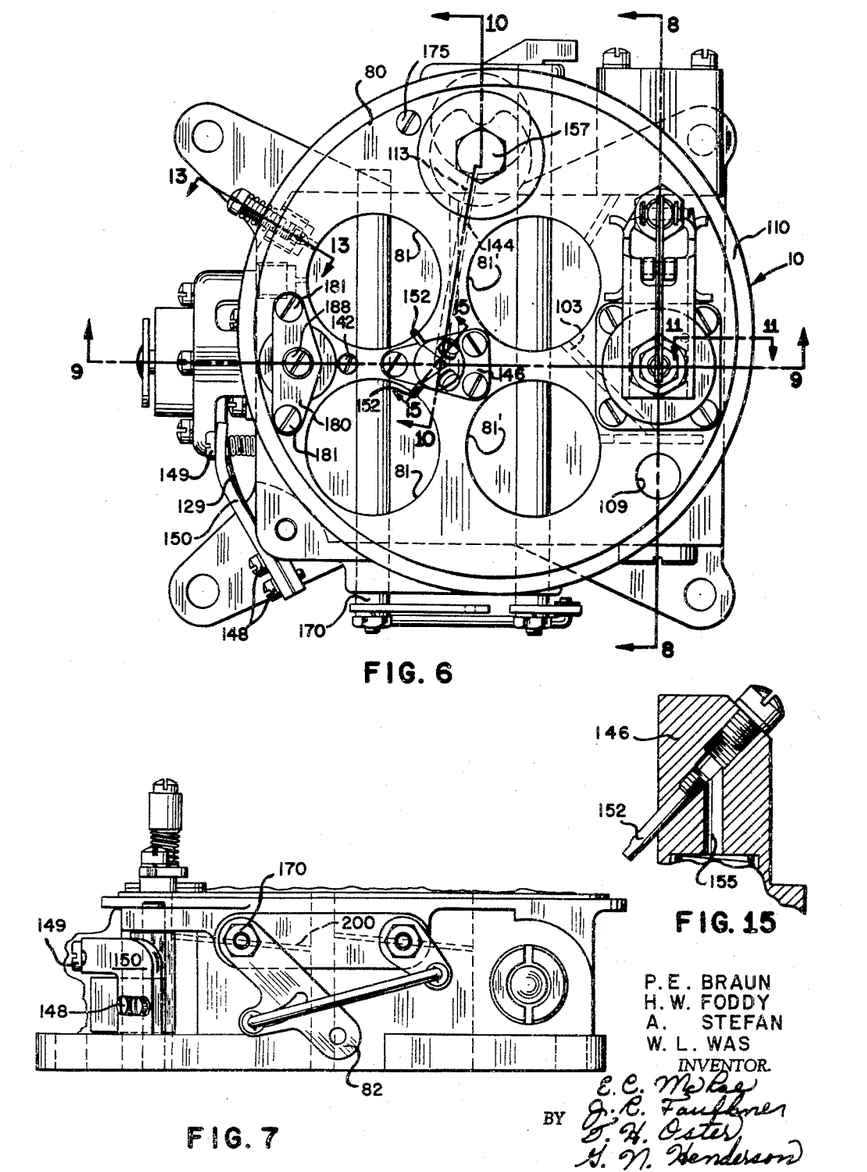
Fig. 6 is a top view of the control unit.
Fig. 7 is a partial side view of the control unit showing the throttle linkage.
Fig. 15 is a partial section of the priming nozzle portion of the control unit taken along line 15—15 of Fig. 6.

Referring to Fig. 6, body 80 provides an annular filter seating ring 110 upon which a filter element may be placed. Primary induction openings 81 and secondary openings 81' are controlled by throttle linkage 82 in the well-known manner.

Figures 8, 14:
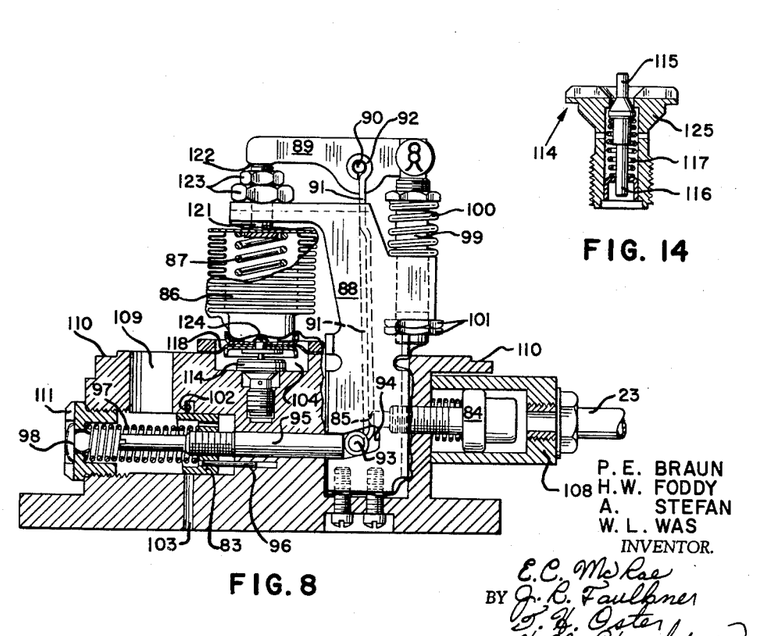
Fig. 8 is a partial sectional view through the control unit taken generally along line 8—8 of Fig. 6.
Fig. 14 is a cross section through a pressure regulating bleed valve.

Referring to Fig. 8, there is seen a partially broken away section through control unit body 80 in which a thermostat 84 is threaded therein. The capsule 108 surrounding thermostat 84 receives heated air through lead 23 from the exhaust stove heater 18 as shown in Fig. 1. Thermostat 84 may be of the kind which reacts to a change in state of matter from a solid to a liquid as fully described in U.S. Nos. 1,656,369, 1,696,929, and 2,580,820. The material within thermostat 84 expands or contracts to axially move push pin 85 in accordance with the engine's temperature. This movement of pin 85 is translated to link 91 which has an eye portion 92 at one end mounted for rotation about pin 90. Link 91 has a roller 93 received therein at its other end and in accordance with the movement of pin 85, roller 93 reciprocates within a pair of cam slots 94 formed within yoke 88. In the illustration shown, pin 85 is in its most extended position corresponding to a fully warmed engine.

Link 91 translates the movement of pin 85 to plunger 95. Threaded on plunger 95 is fast idle air valve 83 reciprocally received within body 80 and guided by guide pin 96. The axial movement of air valve 83 serves to either cover or selectively uncover air annulus 102 formed within body 80 to selectively admit increased quantities of air with decreasing engine temperature into the manifold through manifold opening 103 from filtered air entrance opening 109.

A plunger return spring 97 is interposed between valve 83 and cap screw 111 which maintains contact between roller 93 and plunger 95. An access plug 98 is received coaxially within cap screw 111 whereby the position of sleeve valve 83 on plunger 95 may be adjusted by the rotation of plunger 95 thereby providing a means for adjusting the amount of excess air for fast idle which will be admitted during the operation of a cold engine. In a fully warmed engine, as shown, valve 83 is closed.

The servo control function

Figure 9:
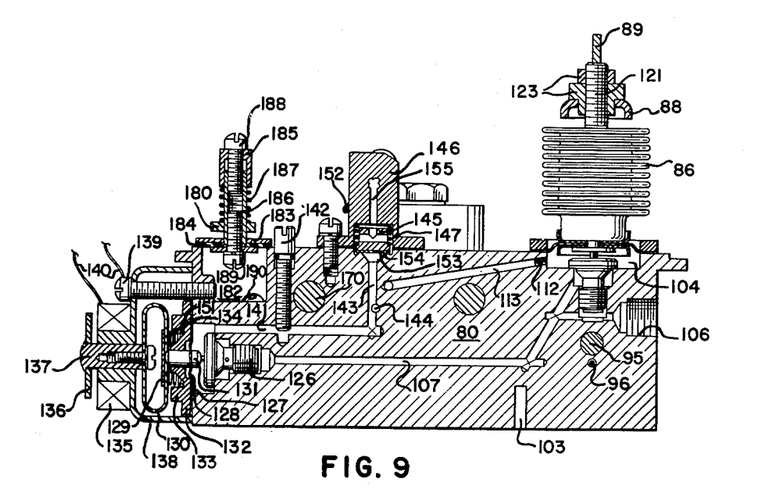
Fig. 9 is another sectional view taken along line 9—9 of Fig. 6.
Figure 11:
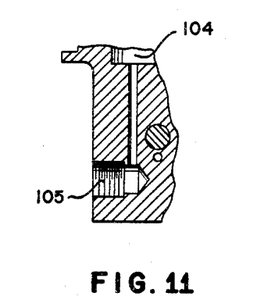
Fig. 11 is a partial section showing the servo pressure outlet taken along line 11—11 of Fig. 6.

As mentioned heretofore, liquid pressure is used for the control of the rack and pinion servo in the fuel metering distributor. Such liquid pressure is received at opening 106 within body 80 of the control unit 10, as shown in Fig. 9, from fuel pump 13. Here, fuel at approximately 20 p.s.i. is applied to pressure regulating valve 114 and to primary passageway 107 to the priming circuit, the function of which will be subsequently explained. Valve 114 bleeds fuel into control chamber 104, which chamber is in communication with chamber 56 of the rack and pinion servo through outlet opening 105 (Fig. 11) and through lead 19 (Fig. 1).

Figure 10:
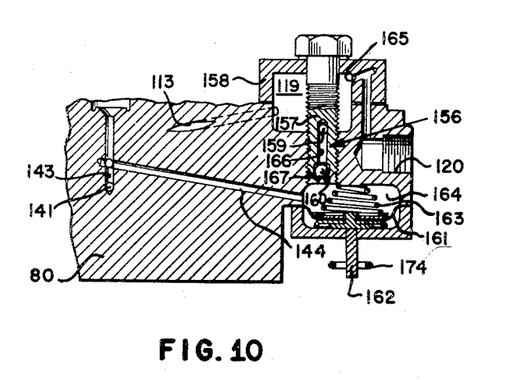
Fig. 10 is a partial section through the accelerator pump taken along line 10—10 of Fig. 6.

A restricted bleed orifice 112 is interposed between control chamber 104 and bleed passageway 113 across which a pressure differential may be formed in accordance with the quantity of fuel admitted into chamber 104 by valve 114. Bleed passageway 113 is in communication with reservoir 119, as shown in Fig. 10, and there the fuel is returned to the fuel tank through outlet 120 and fuel return line 21.

As stated before, the pressure within chamber 104, and thus the pressure applied to the rack and pinion servo, is a function of engine temperature, and air pressure and temperature. An arrangement which accomplishes this is shown in Fig. 8. It was stated in connection with the fast idle air bleed that thermostat 84 is responsive to engine temperature and that the movement of its push pin 85 causes the displacement of link 91. A yoke 88 is provided having substantially parallel sides between which link 91 moves. Within yoke 88 is formed a pair of cam slots 94, and the roller portion 93 of link 91 is adapted to reciprocate within these cam slots upon the movement of push pin 85. The movement of push pin 85 with increasing engine temperature causes link 91 to bear down upon rocker 89. The force thus applied will be transmitted through rocker face 122 to threaded stud 121 of aneroid unit 86. This force will cause the downward movement of stud 121 until lock nuts 123 are bottomed against yoke 88. Thereafter, any further movement of link 91 will only cause the movement of plunger 99 through yoke 88 against spring 100. A pair of lock nuts 101 are threaded on plunger 99 and serve to provide a means for the adjustment of the usable length thereof.

Aneroid unit 86 itself may either expand or contract in accordance with the pressure differential between the inside and the outside thereof. The aneroid unit, being located above the intake manifold and preferably within the filter unit, not shown, is constantly subjected to the pressure and temperature of ambient air. A quantity of nitrogen is sealed therein in order to make the unit temperature, as well as pressure, sensitive.

The force on diaphragm 118 exerted by the aneroid unit 86, either by expansion, contraction, or transmittal of the temperature signal from face 122, will cause valve 114 to open to seek a balance with the fluid pressure within control chamber 104. Diaphragm 118 includes rivet 124 in contact with pintle 115 of valve 114, and operable to open the pintle to admit fuel under pressure from fuel inlet 106 into control chamber 104. Valve 114 (Fig. 14) simply contains a pintle 115, forming with body 125, a valve seat held normally closed by spring 117. Pintle is guided by guide pin 116. Therefore, thermostat 84 and aneroid unit 86 act together to bleed liquid under pressure into control chamber 104, the pressure of which is developed across pressure restriction 122, to position diaphragm 57 of the rack and pinion servo.

Figure 16:
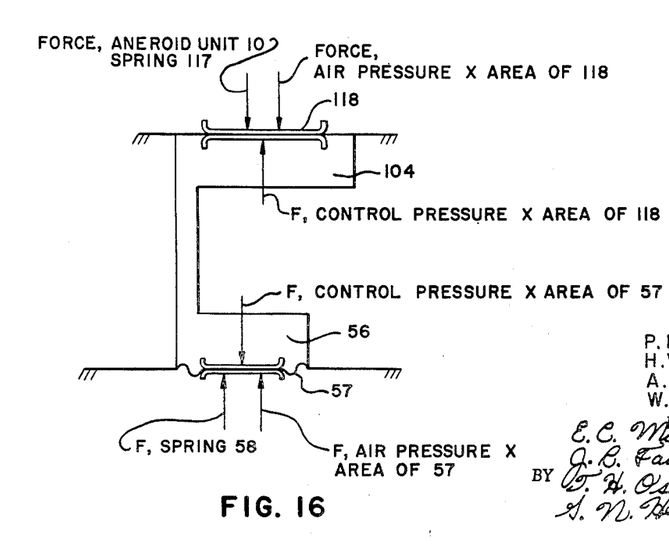
Fig. 16 is a schematic force diagram of the control pressure servo system.

The relationship of the forces which apply to this servo system can most readily be understood with reference to the static force diagram shown in Fig. 16. The force of the aneroid unit 10 is shown as applied to one side of diaphragm 118 which includes the force of the temperature compensation, if any, and the force due to the expansion or contraction of the unit itself. Added to this is the force of the product of air pressure and the area of the diaphragm exposed to the air. These are balanced by the pressure within the control chamber 104 multiplied by the area of diaphragm 118. At the servo end of the force diagram, the control pressure within servo chamber 56 acts upon one side of bellows diaphragm 57, and this is balanced by the force of spring 58, and the product of the air pressure and the area of diaphragm 57. The affect of changes in ambient air pressure can be either cancelled or controlled by controlling the exposed areas of diaphragms 118 and 57. Hence, the effect of air pressure on the aneroid unit will be the controlling influence for the fuel compensation that may be desired relative to the change in air density.

Figure 17:
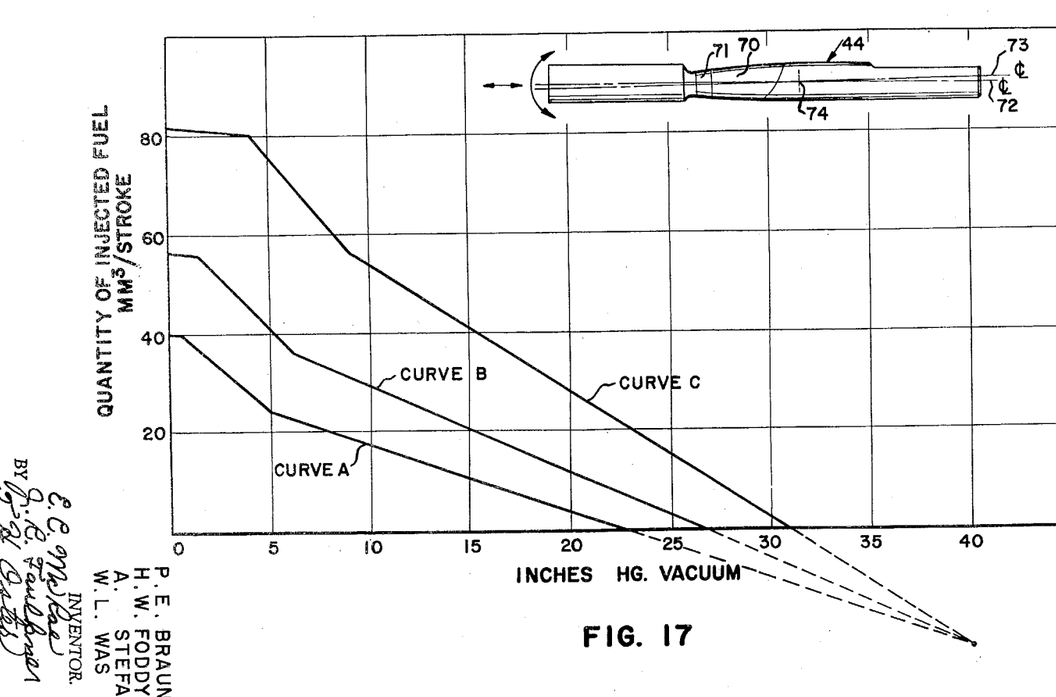
Fig. 17 is a graph of the fuel metering curves with an outline of the metering cam superimposed thereon.

The precise quantity of fuel that is distributed to the injectors at any given time is a function of the position of the metering cone 44. The cone's profile is determined by the characteristic of a fuel metering curve wherein the quantity of injected fuel is plotted against load. A typical set of curves is shown in Fig. 17. The quantity of injected fuel in mm.$^3$/intake stroke is plotted on the axis of ordinates and the intake manifold vacuum is plotted on the axis of abscissas. The characteristic metering curve has essentially two straight-line portions, the longer of which represents the gradient of fuel requirements as against engine load for part load operating conditions, and the steeper of which represents an increased rate of enrichment for heavy load conditions. A profile of the metering cone itself is also shown wherein portions 70 and 71 represent the stepped portions of the cam profile.

Curves "A" and "C" represent examples of the maximum and minimum effect upon the metered fuel quantity brought about by the rotation of cone 44. As stated before, the cam profile thereon may be cam ground to have a centerline 73 offset from the centerline 72 of the cone itself. The point of intersection 74 of the centerlines may be arbitrarily chosen in accordance with the particular requirements of the engine involved, as its location represents a compromise. For the purpose of illustration and explanation, this intersection point is taken at 40″ Hg of vacuum, a theoretical point. The affect upon the injected fuel quantity due to rotating the cone through 180° is equivalent to swinging a metering curve about this intersection point between curves "A" and "C." Curve "C," therefore, represents the maximum compensation that would be provided a cold engine at sea level, and curve "A" represents the compensation at 10,000 feet, 0° F., ambient temperature. Intermediate to these lines curve "B" which represents the compensation provided for sea level, 125° F. ambient temperature.

With regard to the compromise selection of some intersection point 74 for the centerline 73 of the cam ground profile with centerline 72 of the cam, this fact is appreciated when we remember that theoretically, for altitude compensation alone, it would be most desirable to effect a purely parallel shift of the metering curve (that is, to rotate the curve about infinity), since, at increased altitude, the manifold requires a uniformly decreased absolute pressure to obtain the same charge of air that it obtains at lower altitude. However, for temperature compensation, that is, for the increased fuel required for decreased engine operating temperatures, it is desirable to rotate the metering curve about the point of absolute vacuum, approximately −29.9 Hg. Therefore, this arrangement permits a compromise which quite adequately reproduces the theoretical engine requirements in a practical manner over a variety of engine operating conditions.

The priming function

One of the functions of an integrated fuel system is the supply of priming fuel to an engine in quantities sufficient to produce reliable engine starts over a wide range of temperatures. This fuel is supplied to the intake manifold directly through the primary induction openings 81 in the control unit 10 where it then may be drawn into the cylinders. Positive pressure priming is employed and, therefore, the necessity of venturi feeding is obviated.

Referring to Fig. 9, fuel from pump 13 enters the control unit 10 at opening 106, and pressurizes primary fuel pasageway 107. Terminating this passageway is variable priming valve 126. Valve 126 is identical in structure to the servo control pressure regulating valve 114, Fig. 14. Valve 126 is operable, upon being opened by push pin 131, to admit fuel into priming chamber 127. Push pin 131 is carried by diaphragm 128 which forms one wall of chamber 127. As perhaps is best shown in Fig. 6, a bimetal spring thermostat 129 is secured at one end to body 80 by a pair of screws 148. In this position, bimetal spring 129 is subject to both engine heat and ambient air temperature, and since the primer is only operative during engine starts, it provides an accurate indication of the priming fuel requirements of the engine. Tensioning arm 150 and adjusting screw 149 provides a means by which the initial position of bimetal spring 129 may be adjusted.

An enabling solenoid 135 normally holds the bimetal spring 129 retracted from diaphragm 128, as shown. Solenoid core and support 138 is secured to body 80 by means of bolts 139. Upon the energization of the solenoid through leads 140 concomitant with the energization of the starter circuit, solenoid 135 draws up armature 136 carried on a non-ferrous connecting bolt 137. Secured to the other end of bolt 137 is a spring retractor 130, which is driven, upon actuation of the solenoid, to bottom upon abutments 133 of diaphragm retainer 132. This action also compresses retraction spring 151 into its annular retaining groove 134, and bimetal thermostat spring 129 is free to bear upon push pin portion 131 of diaphragm 128 with a force which increases with decreasing engine temperature. The force of bimetal spring 129 upon diaphragm 128 is balanced by the fluid pressure within priming chamber 127 in such a manner that decreasing engine temperature results in increased priming pressure.

Priming chamber 127 is in communication with a pair of priming nozzles 152 through priming passageway 141, vertical passageway 143, and weighted check valve 145. Weighted check valve 145 is reciprocally carried in primer nozzle housing 146, and carries thereon a circular sealing gasket 153 which is registrable with an annular land portion 154 at the terminal of vertical passageway 143. A spring 147 is interposed between valve 145 and nozzle housing 146 to assist in the closing action of the valve.

The function of check valve 145 is to provide a relatively low bias which must be overcome by the pressure within priming chamber 127 before priming occurs. Since the accelerator pump operates through these nozzles, the connection being made within body 80 by the intersection of pasageways 144 and 143 (Fig. 10), and since the accelerator pump is of the flow-through type wherein a nominal pressure of a few p.s.i. is maintained, it is necessary to insert a bias, such as by this valve, to prevent flow through the nozzles 152 except when specifically demanded by accelerator pump action or priming action.

A pair of nozzles 152 receive fuel from the outlet side 155 of valve 145 and are arranged to discharge into the primary induction openings 81 above the throttle plates. Fig. 15 shows this arrangement for one priming nozzle. Fuel pressure at these nozzles caused by the action of spring 129 against diaphragm 128 is removed upon de-energization of solenoid 135, such as concomitant with opening the starter circuit of the engine, thereby permitting spring retractor loop 130 to withdraw spring 129 under the influence of retractor spring 151.

*The accelerator pump function*

The accelerator pump, shown in Fig. 10, receives fuel from the bleed passageway 113 of the servo control chamber 104 through reservoir 119 and check valve 156. A bolt 157 secures cap 158 to body 80 and therein forms reservoir 119 having discharge conduit 165 in communication with weep outlet 120.

Accelerator pump check valve 156 is formed within bolt 157. A passageway 166 is drilled coaxially within the bolt and is terminated at a radially drilled opening 159 in communication with reservoir 119. A second and larger opening is coextensive with pasageway 166 and forms therewith a ball retaining seat with ball 160. The end of the bolt is cross-cut to provide a plurality of ball retaining fingers 167 which serve to retain ball 160 within its seat. In the open position, as shown, fuel may pass down through valve 156 into accelerator pump cavity 164. Upon actuation of the pump diaphragm 161 against spring 163 by lever 162, a portion of cavity 164 is displaced, and the fuel therein is forced through accelerator pump passageway 144 to vertical passageway 143 where it is applied to the priming nozzles 152 through weighted check valve 145.

Figure 12:
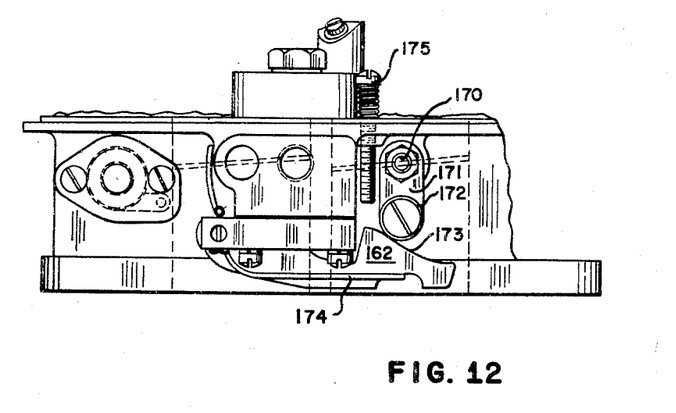
Fig. 12 is another partial side view of the control unit showing the accelerator pump linkage.

The accelerator pump is operator-actuated in the well-known manner, and a mechanism for effecting this pumping action is shown in Fig. 12. Prime throttle shaft 170, connected to throttle link 82 in Fig. 7, when caused to rotate, carries extension arm 171, upon which roller 172 is eccentrically carried, to coact with cam surface 173 of arm 162. A mousetrap spring 174 is carried by arm 162 which maintains the cam surface 173 in contact with roller 172. The extent of total movement of arm 162, and, therefore, the quantity of fuel provided per stroke of the accelerator pump, is limited by adjustable stop screw 175.

*The anti-stall function*

Body 80 defines a chamber 182 which is in communication with the intake manifold at some point below the throttle plates 200 within primary induction opening 81 through opening 190, as shown in Fig. 9. Therefore, chamber 182 is subjected to manifold pressures. A cover plate 183 carries a rubber gasket 184 and is normally drawn down over chamber 182 due to the decreased pressure therein. Cylinder 186 is reciprocally received in bridged support 180. Support 180 is secured to body 80 by screws 181.

Cylinder 186 is internally threaded and carries plate 183 in abutment thereto at one end thereof, secured thereto by screw 189, so that cylinder 186, plate 183, and gasket 184 move as a unit. A coil spring 187 is received over cylinder 186 and in abutment with the top surface of support 180. An outer cylinder 185 is slidably received over cylinder 186 on top of spring 187 and is secured to cylinder 186 by an adjustment screw 188 threadably received in the uppermost end of cylinder 186. Spring 187, being compressed between support 180 and outer cylinder 185, urges the assembled unit to move upward, thereby withdrawing cover plate 183 from chamber 182. The amount of compression of spring 187, determined by the amount by which screw 188 has driven outer cylinder 185 over cylinder 186, determines the force by which cylinder 186 tends to raise cover plate 183.

In the operation of the anti-stall device, assuming the engine is operating, the manifold vacuum will hold cover plate 183 and its gasket 184 to seal the opening to chamber 182. However, should the engine, when idling, begin to stall under such conditions that the stall could be averted by adding additional air to the intake system, the manifold vacuum will decrease to the point where cover plate 183 is released and additional air will immediately enter the manifold through opening 190. This arrangement has particular advantage in a fuel injection system, since the fuel metering distributor, being controlled by a vacuum signal, will immediately add whatever fuel is necessary to provide a combustible mixture. The operation of this anti-stall device, in admitting additional air upon low manifold vacuum, is equivalent to opening the throttle plates by a small amount. The extent by which cover plate uncovers chamber 182 may be controlled by controlling the thickness of the plate 183.

The idle control function

Figure 13:
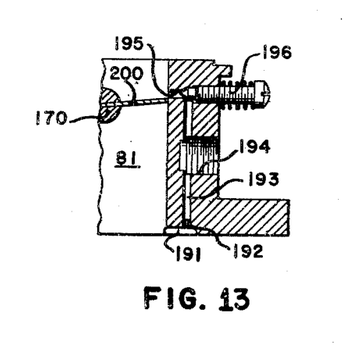
Fig. 13 is a partial sectional view showing the vacuum signal outlet taken along line 13—13 of Fig. 6.

As shown in Fig. 1, the control unit 10 supplies a manifold vacuum signal to the fuel metering distributor through lead 20. Fig. 13 shows the origin of this signal. A routed portion 191 is formed to communicate with a primary induction opening 81 and provides a vacuum signal to passageway 193 through restriction 192. Opening 195 is formed within body 80 to be uncovered and subjected to atmospheric pressure when the throttle plate 200 is in the idle position, as shown. An idle adjust screw 196 is positioned to control the opening of opening 195 to control the amount of air bled therethrough during the time when the opening is uncovered. Vacuum exit 194 is in communication with passageway 193 and is connected to lead 20, Fig. 1, to provide a signal to the vacuum control chamber 47 which is the resultant of the actual vacuum and the decrease in vacuum due to the air bleed through opening 195, creating a pressure differential across restriction 192.

An idle bleed arrangement, such as shown, is desirable with vacuum controlled fuel injection systems, to bleed down the relatively high vacuum at idle, in order to provide an adjustable means for increasing the quantity of fuel which would otherwise be provided to the injectors, to compensate for dilution due to valve overlap and other factors that require additional fuel at idle. As soon as throttle 200 is opened, bleed opening 195 is subjected to a substantially decreased pressure, and will, therefore, become inoperative.

What is claimed is:

1. In an internal combustion engine fuel injection system, first and second signal responsive servo systems each operable to control the quantity of injected fuel, said first servo system responsive to a signal representing the load on the engine, and said second servo system responsive to a signal computed from engine temperature, ambient air pressure and ambient air temperature.

2. In a shuttle-piston fuel injector system that improvement comprising vacuum-operated means for limiting the movement of said shuttle, and means independent of said first-named means for limiting the movement of said shuttle in accordance with air density and engine temperature.

3. In a shuttle-piston fuel injector system wherein the movement of the shuttle controls the quantity of injected fuel, that improvement comprising first control means for limiting the movement of said shuttle in accordance with the engine manifold pressure, and second control means for limiting the movement of said shuttle in accordance with air density and engine temperature.

4. A fuel injection system for an internal combustion engine comprising a shuttle-piston fuel metering distributor, a metering cone rotatably and axially movable on said distributor, a cone follower in cooperative relationship to said cone and operable to limit the free movement of said piston in accordance with its position on said cone, and means operable to rotationally and axially position said cone.

5. A fuel injection system for an internal combustion engine comprising a shuttle-piston fuel metering distributor, a metering cone angularly and axially movable on said distributor, a cone follower positioned between said piston and said cone and operable to limit the free movement of said piston in accordance with its position on said cone, first control means for angularly positioning said cone, and second control means for axially positioning said cone.

6. In a fuel injection system for internal combustion engines that improvement comprising a shuttle piston fuel metering distributor, a metering cone having a cam profile thereon and rotatably and axially movable on said distributor, a cam follower positioned between said shuttle and said cam profile to limit the movement of said shuttle in accordance with the position of said follower on said cam, means to axially position said cam in accordance with one engine fuel requirement, and means to rotatably position said cam in accordance with another engine fuel requirement.

7. A shuttle piston fuel injector for an internal combustion engine comprising first means for limiting the movement of said shuttle piston in accordance with the load on the engine and second means for limiting the movement of said shuttle piston in accordance with ambient air pressure, ambient air temperature and engine temperature.

8. A shuttle piston fuel injector for an internal combustion engine comprising a first control means for limiting the movement of said shuttle piston, said first control means being actuated by engine manifold pressure, a second control means for limiting the movement of said shuttle piston, said second control means being actuated by a signal computed from ambient air pressure, ambient air temperature and engine temperature.

9. A fuel injection system for an internal combustion engine comprising a shuttle piston fuel metering distributor, means rotatably and axially movable on said distributor and operable to limit the movement of said shuttle piston, and control means for rotationally and axially positioning said first mentioned means, said control means including means for axially positioning said first mentioned means in accordance with the load on the engine and including means for rotationally positioning said first mentioned means in accordance with ambient air pressure, ambient air temperature, and engine temperature.

10. A fuel injection system for an internal combustion engine comprising a shuttle piston fuel metering distributor, means angularly and axially movable on said distributor and operable to limit the movement of said shuttle piston, and control means for angularly and axially positioning said first mentioned means, said control means including means for axially positioning said first mentioned means in accordance with the load on the engine and including means for angularly positioning said first mentioned means in accordance with ambient air pressure, ambient air temperature, and engine temperature.

11. A fuel injection system for an internal combustion engine comprising a shuttle-piston fuel metering distributor, a metering cone angularly and axially movable on said distributor, said metering cone having an axial cam surface and an angular cam surface, a cone follower in cooperative relationship to said cone and the cam surfaces, said cone follower being operable to limit the free movement of said piston in accordance with its position on said cone, and means operable to angularly and axially position said cone.

12. A fuel injection system for an internal combustion engine comprising a shuttle-piston fuel metering distributor, a metering cone angularly and axially movable on said distributor, said metering cone having an angular cam surface and an axial cam surface, a cone follower in cooperative relationship to said cone and the cam surfaces, said cone follower being operable to limit the free movement of said piston in accordance with its position on said cone, and control means coupled to said cone for angularly and axially positioning said cone, said control means including first means for axially positioning said cone in accordance with the load on the engine and second means for angularly positioning said cone in accordance with ambient air pressure, ambient air temperature and engine temperature.

References Cited in the file of this patent

UNITED STATES PATENTS

| | | |
|---|---|---|
| 2,126,709 | Alden | Aug. 16, 1938 |
| 2,341,257 | Wunsch | Feb. 8, 1944 |
| 2,670,724 | Reggio | Mar. 2, 1954 |
| 2,731,175 | Downing | Jan. 17, 1956 |
| 2,852,011 | Pringham | Sept. 16, 1958 |
| 2,927,570 | Pringham | Mar. 8, 1960 |